(12) United States Patent
Wontorcik et al.

(10) Patent No.: US 7,995,600 B2
(45) Date of Patent: Aug. 9, 2011

(54) MONITORING RECEIVER HAVING VIRTUAL RECEIVER AND LINE NUMBERS

(75) Inventors: Glenn A. Wontorcik, Corcoran, MN (US); Narine Boodoosingh, Ozone Park, NY (US); Christopher D. Martin, Plainview, NY (US); Richard H. Hinkson, Plainview, NY (US)

(73) Assignee: Honeywell International Inc., Morristown, NJ (US)

( * ) Notice: Subject to any disclaimer, the term of this patent is extended or adjusted under 35 U.S.C. 154(b) by 1368 days.

(21) Appl. No.: 11/089,767

(22) Filed: Mar. 25, 2005

(65) Prior Publication Data

US 2006/0215688 A1   Sep. 28, 2006

(51) Int. Cl.
    *H04L 12/28* (2006.01)
(52) U.S. Cl. ........................................ 370/420; 370/463
(58) Field of Classification Search .................. 370/463, 370/401, 428
    See application file for complete search history.

(56) References Cited

U.S. PATENT DOCUMENTS

| | | | | |
|---|---|---|---|---|
| 6,035,028 | A | * | 3/2000 | Ward et al. ............... 379/201.02 |
| 6,075,997 | A | * | 6/2000 | Lindqvist et al. ............. 455/561 |
| 6,640,278 | B1 | * | 10/2003 | Nolan et al. ...................... 711/6 |
| 7,471,683 | B2 | * | 12/2008 | Maher et al. .................. 370/392 |
| 2002/0126009 | A1 | | 9/2002 | Oyagi et al. |
| 2003/0061325 | A1 | * | 3/2003 | Monroe ........................ 709/223 |
| 2004/0186739 | A1 | | 9/2004 | Bolles et al. |
| 2005/0288062 | A1 | * | 12/2005 | Hammerschmidt et al. ......................... 455/562.1 |
| 2009/0034477 | A1 | * | 2/2009 | Yamaguchi et al. .......... 370/331 |

* cited by examiner

*Primary Examiner* — Seema S. Rao
*Assistant Examiner* — Henry Baron
(74) *Attorney, Agent, or Firm* — Husch Blackwell

(57) ABSTRACT

A virtual receiver having multiple communication ports for connecting a link to a plurality of local security systems. The virtual receiver is programmed with a virtual receiver number and a virtual line number for each physical communication port on the receiver. The virtual receiver has a master/slave operational mode such that the data received from the plurality of local security systems by each receiver is transmitted from at least one selected slave receiver to a selected master receiver. The virtual receiver number and virtual line number is used to create a part of a subscriber number. In master/slave operation mode, M number of receivers are linked together and the possible number of virtual receiver lines in a virtual receiver is M times the number in a normal mode of operation.

21 Claims, 5 Drawing Sheets

MONITORING RECEIVER HAVING VIRTUAL RECEIVER AND LINE NUMBERS

BACKGROUND OF THE INVENTION

1. Field of the Invention

The present invention relates to a monitoring receiver for monitoring a plurality of individual subscriber security systems. More particularly, the invention relates to a monitoring receiver which is configured to have a virtual receiver and a line number.

2. Discussion of the Art

Security systems are commonly used in home and business settings to protect against intruders and other dangers. A security system includes any life, safety, or property protection system. For example, a chain of retail stores may each have a security system that protects their premises. When an intruder or other alarm condition, such as a fire is detected, the local security system may report the alarm to a central monitoring facility or to any local emergency services via a telephone link or other communication link. Personnel at the central monitoring facility may then telephone the local police to report the alarm to have the incident investigated. The communication link connects the central station receiver to the local security system. Each individual subscriber has a number associated with its link. A subscriber number contains a receiver number, a line number and an account number. The receiver and line numbers represent the physical receiver and line that an individual subscriber is linked with.

Each central station receiver contains a plurality of physical lines into which a subscriber link is connected. The actual number of lines depends upon a model of the receiver.

Due to the fact that each receiver model contains a different number of physical lines, it is difficult to maintain the same physical receiver and line number when replacing an older model receiver with a newer model. However, there is a need for a central station operator to have the ability to replace an older model with a newer model such that the receiver number and line number configuration is maintained. This is done such that an individual's subscriber account number for the new receiver remains the same when the account information from the security system arrives into the central station automation system.

BRIEF SUMMARY OF THE INVENTION

The present invention solves the aforementioned problem by providing a system and method such that a replacement receiver can be configured so that the receiver and line numbers are maintained. The central monitoring receiver can, therefore, recognize the subscriber account number when the account information arrives from a plurality of individual receivers.

In one aspect of the invention, a virtual receiver is used to monitor a plurality of individual local security systems each identified by a subscriber number. The virtual receiver includes a plurality of physical ports for connecting the plurality of individual local security systems to the receiver. A programming means is used for selecting a virtual receiver number and a virtual line number for each of the plurality of physical ports. The subscriber number is created from at least a receiver number and a line number.

The virtual receiver further includes a connection used to transmit subscriber information containing at least the virtual receiver and virtual port numbers to an automation computer.

The programming means for the receiver includes a user interface means and can be located at one the receivers or at a remote location.

The receiver uses the virtual receiver number and the virtual line number in place of the actual receiver number and physical line number to create the subscriber number which also includes a 3-10 digit account number programmed into the local security system.

The receiver allows the operator to select the virtual receiver number and virtual line number to a value such that the subscriber number corresponding to the individual local security system always remains the same even if the local security system is connected to a different physical port.

In another aspect, the invention is also directed to a security system apparatus used for monitoring a plurality of local security systems. The apparatus includes a plurality of receivers connected to the local security systems for receiving information from the local security systems. The apparatus further includes an automation computer for processing the received information. The automation computer is connected to the plurality of receivers. Each of the plurality of receivers includes a plurality of physical ports where a communication link is connected between the plurality of receivers and the local security systems, and a programming means for inputting operating information into the each of the plurality of receivers. The operating information can include a virtual receiver number and a virtual line number. The operating information further can include modes of transmission, such as master/slave automation.

The virtual receiver number and virtual line number is selected such that the subscriber number corresponding to the individual local security system always remains the same, even if the local security systems is connected to a different physical port. The virtual line number can be M×N, where M is a number of receivers connected, and N is a number of physical ports on each receiver.

The apparatus includes a master receiver and at least one slave receiver, and the information received by the plurality of receivers is transmitted through the master receiver in the master/slave mode to the automation computer.

The above and other features of the invention, including various novel details of construction and combinations of parts, will now be more particularly described with reference to the accompanying drawings and claims. It will be understood that the various exemplary embodiments of the invention described herein are shown by way of illustration only and not as a limitation thereof. The principles and features of this invention may be employed in various alternative embodiments without departing from the scope of the invention.

BRIEF DESCRIPTION OF THE DRAWINGS

These and other features, benefits and advantages of the present invention will become apparent by reference to the following text and figures, with like reference numbers referring to like structures across the views, wherein.

DETAILED DESCRIPTION OF THE INVENTION

Figure 1:
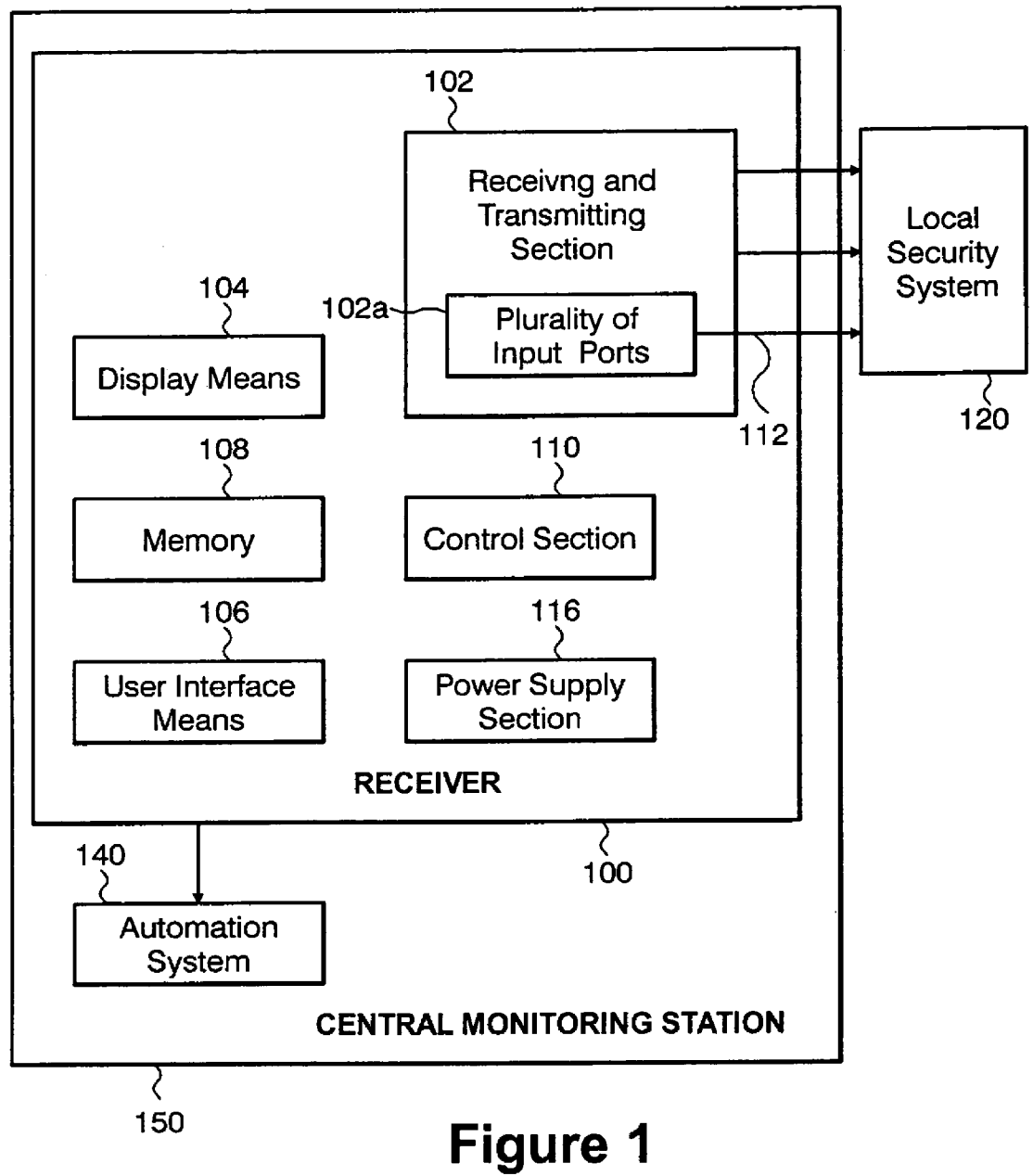
FIG. 1 illustrates a central monitoring station with a virtual receiver according to the invention.

FIG. 1 illustrates a central monitoring station 150 having a virtual receiver 100 which is operated according to the invention for monitoring incoming calls to the central monitoring station 150. The virtual receiver 100 includes a receiving and transmitting section 102, a display means 104, a user interface means 106, a memory section 108, a control section 110, a plurality of communication links 112, and a power supply section 116. The receiving and transmitting section 102 typically includes a plurality of input ports 102a that allows a connection to a plurality of local security systems 120 over the plurality of communication links 112. The plurality of communication links 112 enable the local security system 120 to report an alarm to the central monitoring station 150. Typically the plurality of communication links 112 are telephone links; however, the virtual receiver is capable of using any available communication links, such as DSL or cable modem, long range radio, cellular, Internet or Intranet. The communication links allow the central monitoring station 150 to monitor in real time the status of each of the local security systems 120 that are connected to a virtual receiver 100 at the central monitoring station.

The receiver 100 sends data that is received from the local security system 120 to an automation system or computer 140 for processing. The automation system 140 processes the received data using a unique subscriber number that is assigned to each local security system.

The control section 110 controls the overall processing of all user-inputted commands and other pre-programmed instructions stored in the memory section 108. The display means 104 displays various menu options, user updated inputted commands, and other data such as a virtual receiver and line number. The memory section 108 is used for storing pre-programmed instructions and local security system identifiers such as subscriber numbers, virtual receiver numbers, and line numbers.

The user interface means 106 can be of any known form such as an alphanumeric keypad, a touch panel, a keyboard, or a remote computer which functions to input data.

The receiving and transmitting section 102 receives and transmits signals to and from the plurality of local security systems and is controlled by the control section 110.

Each of the plurality of input ports 102a has a unique number assigned to a physical connection between an individual local security system 120 and the central monitoring facility 150. The plurality of input ports 102a are numbered 1 through N, wherein N is the total number of ports on the receiver 100.

Figure 2:
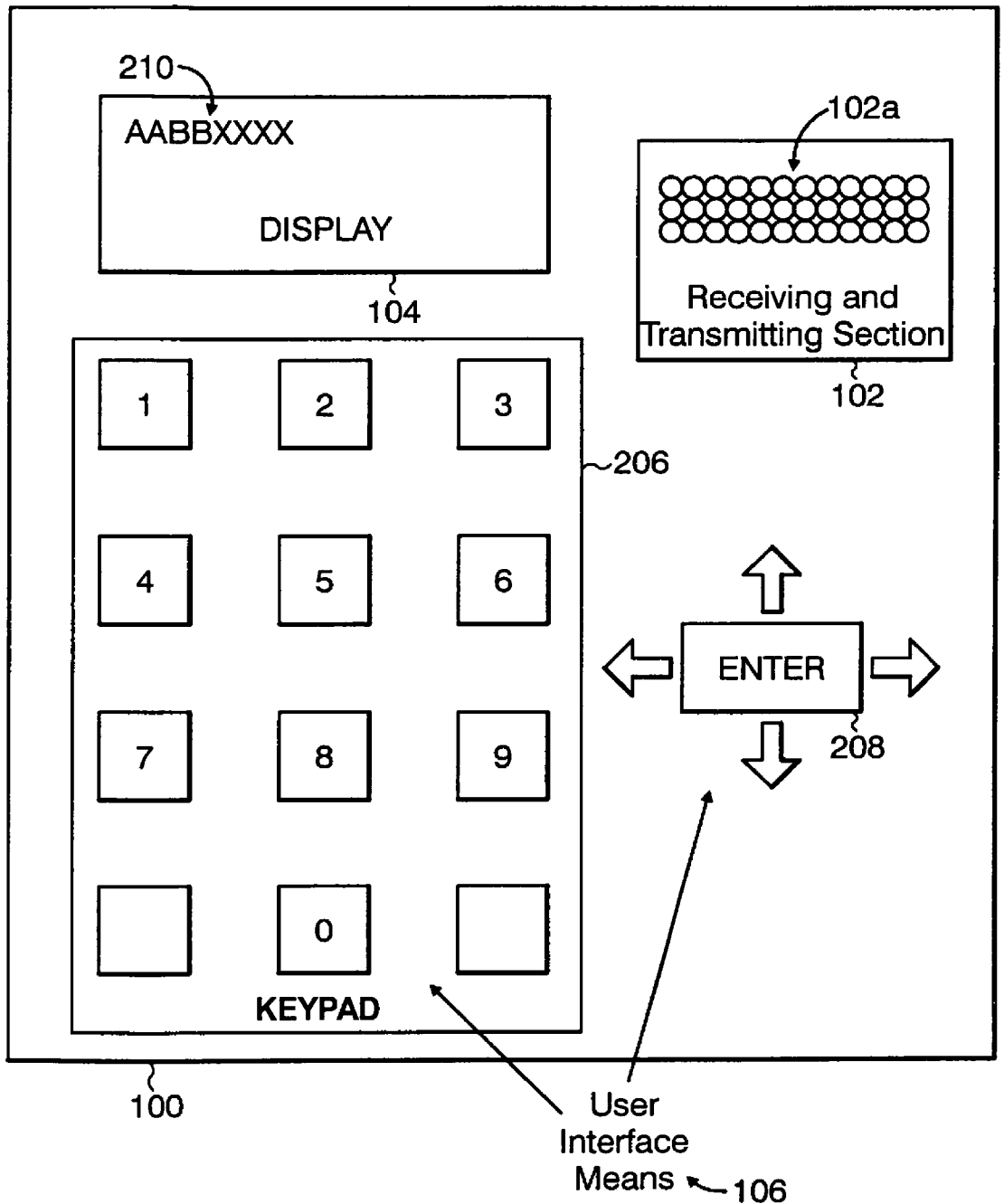
FIG. 2 illustrates a sample receiver according to the invention.

FIG. 2 illustrates a sample virtual receiver according to one illustrative embodiment of the invention. The virtual receiver 100 includes an alphanumeric keypad 206 and an enter button 208 as the user interface means 106. The virtual receiver 100 has 36 input ports 102a of the receiving and transmitting section 102. The display means 104 is a four-line display. Since there are 36 inputs ports 102a, the receiver 100 will also have 36 communication links 112.

The format of a conventional subscriber number or account number 210 is shown in the display means 104 in FIG. 2. An account number or a subscriber number 210 identifies each individual local security system 120. This allows the operator at a central monitoring facility 150 to authenticate a call or an alarm and send a proper response to the alarm to the correct location. A typical account number or subscriber number 210 includes a number which corresponds to the physical receiver number and input port number in which the individual local security system 120 is connected via one of a plurality of communication links 112. The first two digits of the subscriber number that is sent to the automation system correspond to the receiver number in which the communication link is connected as illustrated on display 100 by "AA". Each individual receiver 100 is assigned a two-digit number (00-99). The second two digits of the subscriber number that is sent to the automation system correspond to the physical input port where one of the plurality communication links 112 is located as illustrated on display 100 by "BB". The receiver number and line or port number is added to a personal account number when information is forwarded to the automation system. The final set of digits represents a personal account number for the individual local security system as illustrated on display 100 as, for example "XXXX". For example, if one of a plurality of communication links 112 are connected to receiver 3, port 10 and the personal account numbers is 1234, the subscriber number would be 03101234 or 011010234567890.

According to the invention, an existing receiver 100 can be replaced without changing a subscriber number 210 even when the number of physical ports on the old receiver is not the same as the number of physical ports on the new receiver. This functionality provided by the invention has many advantages. For example, when the account information corresponding to a subscriber number 210 arrives at a central station automation system, the automation system will recognize the subscriber number and account information even though the physical locations communication link has been changed.

To maintain the same subscriber or account number 210, a virtual receiver and port number has to be created such that the receiver and port number does not change when any of the plurality of communication links 112 is repositioned in the new receiver at a different input port or different receiver. The virtual receiver and line number is used when displaying, printing, and sending data to and from the central automation system through an automation port.

Figure 3:
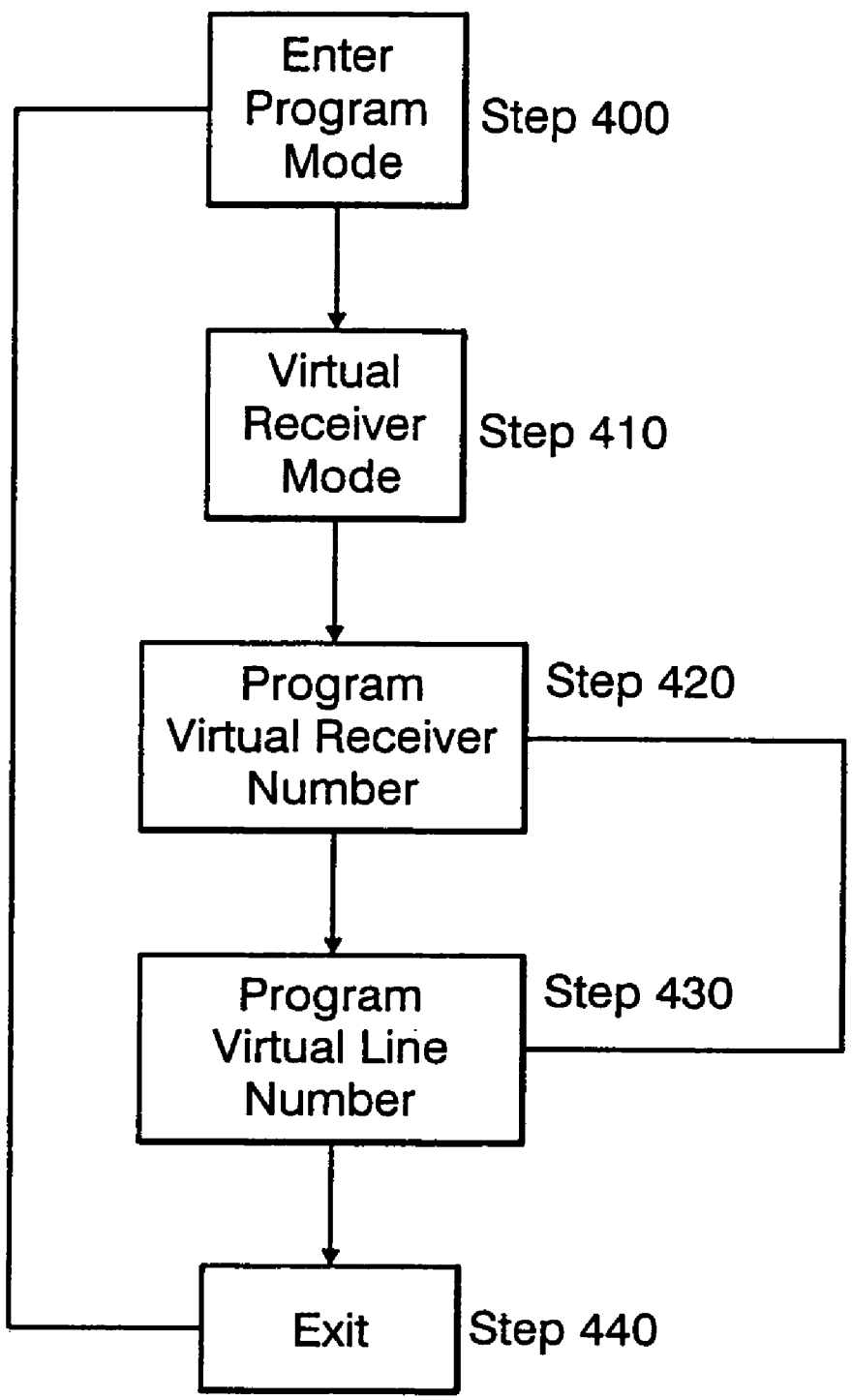
FIG. 3 is a flow chart showing sequence of steps in the process of programming the virtual receiver.

FIG. 3 is a flow chart showing the sequence of steps in assigning a virtual receiver number, port number and/or line number. Explanations of the process will reference the receiver depicted in FIG. 1 and the sample receiver as depicted in FIG. 2. This reference is solely for description only and the invention is not limited to the described configuration.

In order to enter a virtual receiver and port number, the operator must enter program mode at step 400. The operator using the interface means 106 selects program mode from a list of general options displayed on a display means 104. The display means 104 will show all of the various program options, one of which is the virtual receiver mode. For example, the operator can select the virtual receiver mode by depressing the appropriate button on the alphanumeric keypad 206 in the user interface means 106.

At step 410 as the virtual receiver mode is activated, all of the physical ports in the receiver are displayed on the display means 104. For example, the display means 104 will show all of the physical port numbers L1 to LN, where N is the total number of ports available on the receiver. The display also includes a virtual receiver number and line number.

The virtual receiver 100 prompts the operator to input a virtual receiver number for the first physical port on the virtual receiver 100. The display means 104 will flash on the space for the virtual receiver number of one of the ports in the virtual receiver 100 to indicate that the virtual receiver 100 is ready for programming of the virtual receiver number.

The operator enters the desired virtual receiver number using the alphanumeric keypad 206 of the user interface means 106 at step 420. If a zero is programmed for the virtual receiver number for any given physical port number, then the virtual receiver 100 will assign the physical receiver number as the virtual receiver number, and the virtual line number will be the physical port number.

Once the virtual receiver number is entered into the virtual receiver, the operator must advance to the virtual line number field to move to the step 430. This is done using the user interface means 106.

The operator enters the desired virtual line number ranging from 0-X where X is the maximum virtual line number using the alphanumeric keypad 206 of the user interface means 106 in the program virtual line number, step 430. If a zero is programmed for the virtual line number for any given physical port number, then the virtual receiver 100 will assign the physical port number as the virtual line number:

Once both the virtual receiver and line numbers have been supplied, the operator must depress the enter/menu button on the user interface means 106 for the virtual receiver to accept entry. The virtual receiver 100 and line numbers are stored in a memory section 108.

If the virtual receiver number or the virtual line number contains an error, the operator can correct the error using the user interface means 106. For example, the operator can press a left arrow key on the user interface means 106 until the error is flashing on display means 104 indicating that the virtual receiver 100 will accept the error correction.

In the case when both the virtual receiver and line number are correct, the operator will enter the information into memory 106 and will increment the physical line or port number by 1 to the next line. For example, if the operator was programming the first port number L01, depressing the enter/menu button on the user interface means 106 will enable the operator to program the second physical port number L02.

For each of the plurality of physical port numbers, steps 420 and 430 are repeated, such that all of the physical ports can be defined and configured. During the initial configuration, steps 420 and 430 are repeated for 1 to N times, where N is the total number of physical ports available on the receiver. Thereafter, steps 420 and 430 are repeated only if a communication link connected to a physical port is modified or changed.

In the event that all of the plurality of physical ports 102 in the receiving and transmitting section 102 are defined and configured, the operator can exit at step 440 the virtual receiver mode 410 and the program mode 400. To exit from the virtual receiver mode 410 and the program mode 400, the operator will use the user interface means 106 to navigate through the menu tree to go to the main menu.

A sample configuration of a physical port will now be described. If, for instance, an old receiver had 8 ports and was assigned a receiver number of 55 and the communication link was physically connected to the port 08, the first four digits of the subscriber number would be 5508. However, in the new physical receiver configuration, if the communication link is now connected in receiver 18 and port 31 the subscriber number would have the first four digits of 1831. The subscriber number 300 would not be the same, and the automation system would not recognize that number. However, when programming the virtual receiver according to the method described, the number would remain the same. At receiver 18, the operator would program port 31 to have a virtual receiver number of 55 and virtual line number of 08. Therefore, the subscriber number would remain the same.

Furthermore, the virtual receiver 100 allows for multiple receiver numbers to be assigned to the same receiver. Furthermore, if desired, the same virtual port number can be assigned to more than one of the plurality of physical ports 102a on the same virtual receiver 100.

Programming the virtual receiver and line numbers has been described using the user interface means 106 on the virtual receiver. However, it is within the scope of the invention to use a configuration computer at a remote location from the receiver to program virtual receiver and line numbers where the configuration computer is connected to the receiver via a network.

In a second embodiment of the invention, a plurality of the virtual receivers 100 are connected and operated in a master/slave configuration. This connection allows for data to be transferred between receivers. When the receivers are in master/slave automation mode, each virtual receiver number can have from 1 to M×N lines assigned to it, where M is the number of receivers and N is the total number of physical ports on each receiver.

Figure 4:
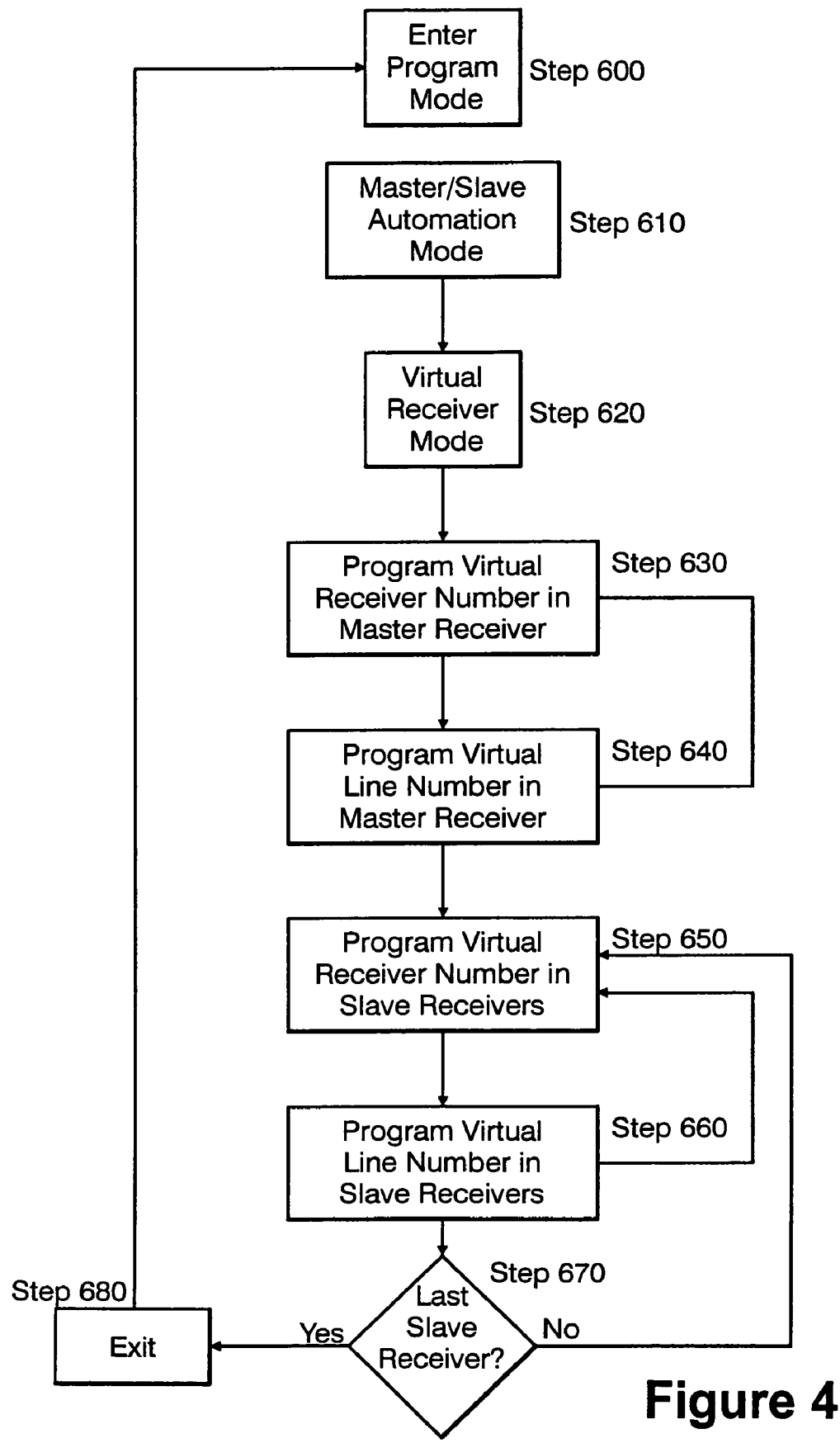
FIG. 4 is a flow chart showing sequence of steps in the process of programming the virtual receiver in master/slave mode of operation.

FIG. 4 is a flow chart showing the sequence of steps in assigning a virtual receiver and line number in master and slave configuration. FIG. 4 is similar to the flow chart of FIG. 3 except additional steps are added for the master/slave automation mode 610 prior to entering the virtual receiver mode, as referenced in FIG. 3 as 410 and in FIG. 4 as 620, and after steps 420 and 430.

Similar to entering the virtual receiver and line number in a normal virtual receiver operation, when entering the virtual receiver and port number in a master/slave mode, the operator must enter the program mode 600. The operator using the interface means 104, selects program mode 600 from a list of general options displayed on a display means 104. For example, this is done by depressing the "1" button on the alphanumeric keypad 206 in the user interface means 106. The display means 104 will show all of the various program options. The operator using the alphanumeric keypad 206 in the user interface means 106 enters the master/slave automation menu. The master/slave automation menu allows the operator to select a receiver 100 as a master receiver and the other receivers as the slave receivers. The operator using the user interface means 106 activates any of one of the receivers as a master receiver. In the master/slave automation menu the operator selects "master receiver" from the menu.

Once the master receiver is set, the operator must set the other receivers as the slave receivers. In the other receivers, the operator enters program mode. The operator, using the interface means, selects program mode from a list of general options displayed on a display means 104. This is done using the numeric keypad in the user interface means 106. Once again the operator uses the alphanumeric keypad 206 in the user interface means 106 to enter the master/slave automation menu. In the master/slave automation menu the operator selects "slave receiver" from the menu. This process is repeated for each of the slave receivers.

After each of the plurality of receivers are set as either a master receiver or a slave receiver, the receivers are ready to enter virtual receiver mode. Programming a virtual receiver number and a virtual line number in the master and slave receivers in master/slave automation mode is similar to programming the virtual receiver and port number in normal operation mode, except that the virtual port number can be M times as large in master/slave automation mode, where M is the number of receivers linked together. For example, by using the master/slave automation option, the operator may program up to M×N different ports, where N is the number of ports on a receiver.

By reference to FIGS. 1, 2, and 4 explanation of how to program the virtual receiver and virtual line number will be given. The operator configures all of the plurality of physical ports 102a for the virtual receiver 100, which is selected as the master receiver first. To exit the master/slave automation menu, the operator depresses the right arrow key on the user interface means 106 until the display means 104 displays the general option menu. The operator will then select the virtual receiver mode 620 from the general options menu using the user interface means 106.

In the master receiver, at step 630, the virtual receiver 100 will prompt the operator to input a virtual receiver number for one of the physical ports on the receiver 100.

The display means 104 will flash on the space for virtual receiver number of the first port to indicate that the receiver is ready for programming of the virtual receiver.

The operator enters the desired virtual receiver number using the alphanumeric keypad 206 of the user interface means 106 in the program virtual receiver number mode 630. Just as in normal operation mode, if a zero is programmed for the virtual receiver number for any of the plurality of ports 102a, then the virtual receiver 100 will assign the physical receiver number as the virtual receiver number and the virtual port number will be the physical port number.

Once the virtual receiver number is supplied to the receiver, the operator must depress the right arrow key on the user interface means 106 to advance to the virtual line number field and to the program virtual line number step 640.

The operator enters the desired virtual line number ranging from 1–N×M using the alphanumeric keypad 206 of the user interface means 106 in the program virtual line number mode 640 where N is the number of physical ports on the receiver and M is the number of receivers connected in step 640. If a zero is programmed for the virtual line number for any given physical port, then the virtual receiver 100 will assign the physical port number as the virtual line number.

Once both the virtual receiver and port numbers have been entered, the operator must depress the enter/menu button on the user interface means 106 for the virtual receiver to accept entry. The virtual numbers and port numbers are stored in memory 108.

The method of programming the virtual receiver and port number is repeated for each of the plurality of physical ports of the master receiver.

After all of the plurality of ports 102a in the master receiver have been configured, the operator will repeat the process for each of the slave receivers at steps 650 and 660. In the slave receiver, the operator will first enter the virtual receiver number, at step 650. The operator will then enter the virtual line number, at step 660. Again this process will be repeated for each physical port on the receiver. At step 670, the operator will determine if all of the slave receivers have been configured. If all the receivers have not been configured, steps 650 and 660 are repeated. If all have been configured, the operator proceeds to step 680, exit.

Figure 5:
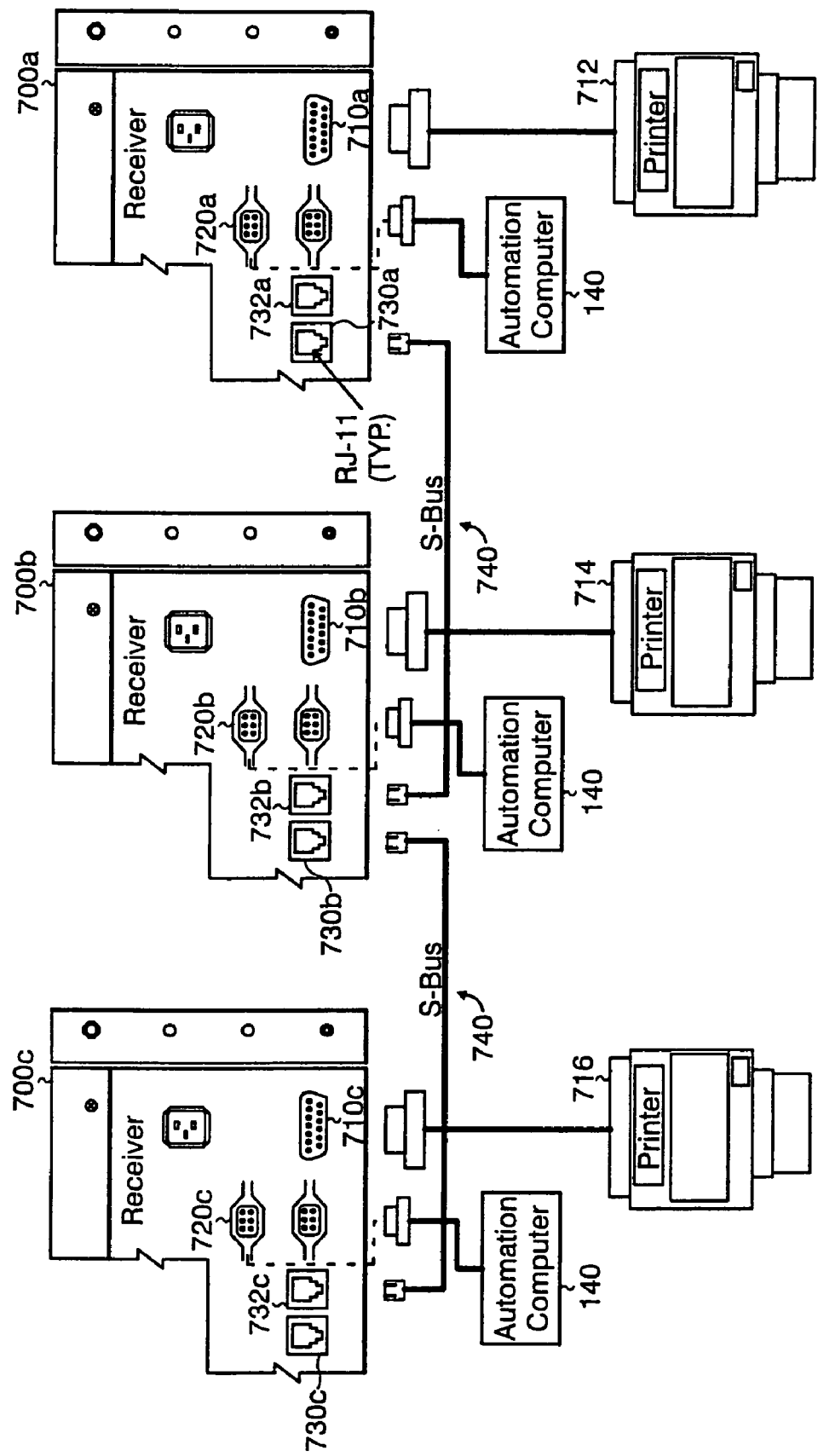
FIG. 5 illustrates an example of three virtual receivers operating according to the second embodiment of the invention.

Operating the virtual receiver in master/slave automation mode has its advantages over operation in normal mode. FIG. 5 is a sample of three receivers linked together and operated in master/slave automation mode. During master/slave mode only the port for the receiver, which is selected as the master receiver, actively transmits information. The slave receiver transmits the virtual receiver numbers, virtual line numbers and other information through the master receiver's serial port, which reduces the number of active serial ports at the central monitoring facility 150.

In FIG. 5, each receiver 700a, 700b, and 700c includes a printer port 710a, 710b and 710c for connecting to each printer 712, 714, and 716, respectively. Each receiver 700a, 700b, and 700c includes at least one automation port 720a, 720b, and 720c for connecting to an automation computer. As depicted in FIG. 5, each receiver 700a, 700b, and 700c has two automation ports. However, each receiver 700a, 700b, and 700c can have more or less automation ports.

Additionally each receiver 700a, 700b and 700c has two communication ports (730a, 732a, 730b, 732b, 730c and 732c) respectively. Each receiver 700a, 700b and 700c is connected to each other receiver by the communication ports using a connection means 740. The communication ports are two S-Bus ports in FIG. 5. However, any communication port can be used with the invention. The communication ports 730a, 732a, 730b, 732b, 730c, and 732c allow for information and data to be shared and transmitted from one receiver to another.

In FIG. 5 receiver 700a is the master receiver and receivers 700b and 700c are the slave receivers. All data received by the receivers 700a, 700b, and 700c will be redirected to the master receiver 700a.

Specifically, all data received from a plurality of local security systems 100 by the receivers selected to be slaves 700b and 700c will have the data transmitted through their respective communication ports 732b, 730b, 732c and 730c to the receiver selected as the master receiver communication ports 730a and 732a. The information will then be sent to the master receiver printer 712 through the printer port 710a and to the automation computer 140 through the automation port 720a. At the same time data received from a plurality of local installed security systems received by the master receiver 700a will also be processed by the master receiver 700a and transmitted to printer 712 through the port 710a and to an automation computer 410 through the automation port 720a.

In the example, as shown in FIG. 5, printers 714 and 716, printer ports (710b, 710c), and automation ports (720b, 720c) are inactive.

In contrast, when operation is in normal mode, each of the printer ports (710a, 710b, 710c) and automation ports (720a, 720b, 720c) are active and actively transmit data.

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. A virtual receiver of an end user at a central monitoring station used to monitor a plurality of individual local security systems, said virtual receiver comprising:
  a plurality of subscriber numbers each associated with a respective local security system of the plurality of security systems and where the subscriber number includes a physical receiver number and line number previously assigned to the local security system and where each subscriber number identifies a source of an alarm to a central alarm monitoring station; and
  at least one replacement physical receiver of the end user at the central monitoring station, the physical receiver further comprising:
    a transmitting and receiving section including a plurality of replacement physical ports that connect a respective port of the plurality of ports to each of the plurality of individual local security systems;

a memory retaining a virtual receiver number and a virtual line number assigned to each of said plurality of replacement physical ports of the virtual receiver and to the respective local security system connected to the port, wherein the assigned virtual receiver number and the virtual line number together define a physical connection monitoring the respective local security system in real time through the replacement physical receiver wherein the virtual receiver and line number of the respective local security system are used in place of the previously assigned receiver number and the previously assigned physical line number; and an automation system that monitors for and identifies alarms from one of the plurality security systems sent to a central monitoring station based in part upon the virtual line number and virtual receiver number, such that the subscriber number corresponding to the individual local security systems remains the same even if a local security system is connected to a different replacement physical port.

2. The virtual receiver of claim 1, further comprising a connection used to transmit subscriber information, containing at least said virtual receiver number and virtual port number to an automation computer.

3. The virtual receiver of claim 1, wherein said programming means includes a user interface means.

4. The virtual receiver of claim 1, wherein said programming means is located at a remote location.

5. The virtual receiver of claim 1 wherein an operator selects the virtual receiver number and virtual line number.

6. A method of configuring a virtual receiver of an end user at a central monitoring station used to monitor a plurality of individual local security systems, said method comprising the steps of:

providing a plurality of subscriber numbers each associated with a respective local security system of the plurality of security systems and where the subscriber number includes a physical receiver number and line number previously assigned to the local security system and where each subscriber number identifies a source of an alarm to a central alarm monitoring station;

the end user providing at least one replacement physical receiver having a plurality of physical ports;

coupling a port of the plurality of physical ports to a respective security system of the plurality of security systems;

the end user assigning a virtual receiver number to each of the plurality of physical ports and to the respective security system coupled to the port;

the end user assigning a virtual line number to each of the plurality of replacement physical ports and to the respective security system coupled to the port where the assigned virtual receiver number and corresponding virtual line number together define a respective physical connection through the at least one replacement receiver to the respective security system;

storing the virtual receiver number and virtual line number in memory;

creating a replacement subscriber number for identifying alarms to the end user at the central station from each of said individual local security systems where said created replacement subscriber number comprises at least said virtual receiver number from memory followed by said virtual port number from memory, such that the replacement subscriber number corresponding to said individual local security systems remains the same for each subsequent alarm reported from said individual local security system even if a local security system is connected to a different physical port; and recognizing the security system based upon the replacement subscriber number.

7. A method of configuring a plurality of virtual receivers for receiving information by an end user at a central monitoring station from a plurality of local security systems, said method comprising the steps of:

the end user providing a plurality of subscriber numbers each associated with a respective local security system of the plurality of security systems and where the subscriber number includes a physical receiver number and line number previously assigned to the local security system and where each subscriber number identifies a source of an alarm to a central alarm monitoring station;

the end user providing a plurality of replacement receivers;

the end user connecting each of said plurality of replacement receivers in accordance with a master/slave relationship;

the end user programming a virtual receiver number for each of a plurality of physical ports on each of said plurality of replacement receivers;

the end user programming a virtual line number for each of a plurality of physical ports on each of said plurality of receivers where each virtual receiver number and corresponding virtual line number together define a physical path between a physical port of each slave receiver of the plurality of receivers and a central monitoring station side of a corresponding master receiver of the plurality of receivers;

storing the respective virtual receiver number and corresponding virtual line number of each physical path and physical port in memory;

coupling a port of the plurality of physical ports and defined physical path through said plurality of receivers of the port to a security system of the plurality of security systems;

creating a subscriber number equivalent to the provided subscriber number for each of the plurality of local security systems for use with each coupled port and physical path that includes at least said virtual receiver number of the coupled physical path retrieved from memory followed by said virtual line number of the coupled physical path retrieved from memory wherein said each created subscriber number is used for processing alarms subsequently received from the local security systems and where each created subscriber number identifies sources of alarms to the end user of the central alarm monitoring system from each of the local security systems; and recognizing the security system based upon the equivalent subscriber number.

8. The method of claim 7, wherein said mode of transmission is master/slave mode.

9. The method of claim 7, wherein said step of selecting a mode of transmission further comprises:

selecting one of said plurality of receivers as a master receiver; and selecting the other of said plurality of receivers as slave receivers.

10. The method of claim 7, wherein said steps of programming a virtual receiver number and virtual line number is first performed in said selected master receiver.

11. The method of claim 7, wherein said virtual receiver number and said virtual line number are assigned such that said subscriber number corresponding to said local security system remains the same regardless of which of said plurality of physical ports a communication link is connected.

12. The method of claim 8, wherein information received by said plurality of receivers is transmitted through the selected master receiver in said master/slave mode to an automation computer.

13. The method of claim 7, wherein said virtual line number is M×N, where M is a number of receivers connected and N is a number of physical ports on each receiver.

14. A monitoring system apparatus of an end user at a central monitoring station used for monitoring a plurality of local security systems, comprising:
- a plurality of subscriber numbers each associated by the end user with a respective local security system of the plurality of security systems and where the subscriber number includes a physical receiver number and line number previously assigned to the local security system and where each subscriber number identifies a source of an alarm to a central alarm monitoring station;
- a plurality of replacement physical receivers of the end user at the central monitoring station connected to said local security systems in a master/slave relationship for receiving information from said local security systems;
- an automation computer of the end user at the central monitoring station for processing said received information;
- each of said plurality of replacement physical receivers including a plurality of physical ports where a physical path is established between some of the plurality of physical ports of at least some slave receivers of said plurality of replacement physical receivers and respective ports of a master receiver of said plurality of replacement physical receivers and where the physical ports of the at least some slave receivers are connected to said respective local security systems;
- a programming means for inputting operating information into each of said plurality of replacement receivers;
- wherein said operating information include a virtual receiver number and a corresponding virtual line number that together identify a respective physical path through the plurality of receivers, wherein the virtual receiver number, the corresponding virtual line number and the identified physical path are each assigned to a port of a respective local security system of the plurality of local security systems and where the virtual receiver number and corresponding virtual line number, in part, define a subscriber number for each of the plurality of local security systems used with the replacement physical receivers and where the automation computer uses the subscriber number to monitor in real time for and identify sources of respective alarms from the security systems to the central alarm monitoring station, wherein the subscriber number of each of the plurality of local security systems provided through the previously assigned physical receiver is the same as the subscriber number through the replacement physical receiver and wherein that automation computer recognizes alarms from each of the plurality of local security systems based in part upon the virtual receiver number and virtual line number.

15. The monitoring system apparatus of claim 14 wherein said subscriber number is created by at least said virtual receiver number followed by said virtual line number.

16. The monitoring system apparatus of claim 14, wherein said operating information includes modes of transmission.

17. The monitoring system apparatus of claim 15, wherein the virtual receiver number and virtual line number are selected such that the subscriber number corresponding to said individual local security system always remains the same even if the local security system is connected to a different physical port.

18. The monitoring system apparatus of claim 16, wherein the mode of transmission is master/slave mode.

19. The monitoring system apparatus of claim 18, wherein there is a master receiver and at least one slave receiver.

20. The monitoring system apparatus of claim 19, wherein the information received by said plurality of receivers is transmitted through the master receiver in said master/slave mode to the automation computer.

21. The monitoring system apparatus of claim 18 wherein said virtual line number can be M×N, where M is a number of receivers connected and N is a number of physical ports on each receiver.

* * * * *